March 7, 1939.  R. E. COATS  2,149,761
BICYCLE LOCK
Filed April 7, 1938
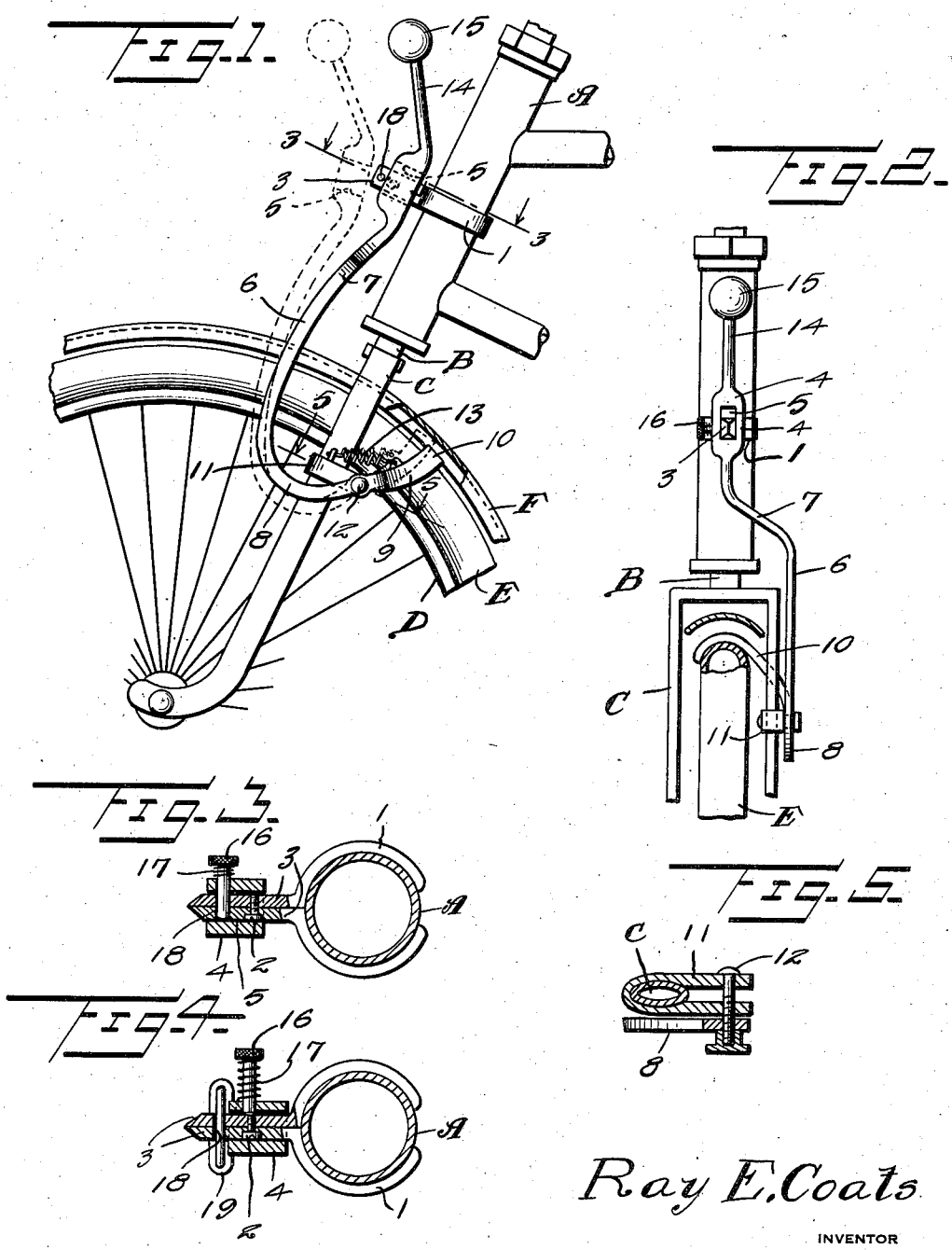
Ray E. Coats
INVENTOR
BY Victor J. Evans & Co.
ATTORNEYS Patented Mar. 7, 1939

2,149,761

UNITED STATES PATENT OFFICE 2,149,761

BICYCLE LOCK

Ray E. Coats, Lewistown, Ill.

Application April 7, 1938, Serial No. 200,764

4 Claims. (Cl. 70—228)

This invention relates to bicycle locks, and its general object is to provide a device of that character in the form of a brake, which not only functions to firmly grip the front wheel of a bicycle to hold the same against rotation, but prevents the turning thereof on its vertical axis, through the steering mechanism so that the bicycle can be readily parked on an inclined ground surface for disposal against a suitable supporting structure therefor, such as a building, without fear or possibility of the bicycle rolling away and falling, and the device can be locked accordingly by suitable key actuated means, such as a pad lock.

A further object is to provide a locking and holding device for a bicycle, that can be operated in an easy and expeditious manner, can be readily applied to any type of bicycle, is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a side elevation illustrating my device applied to a bicycle, in operative position in full lines and in normal position in dotted lines.

Figure 2 is a front view thereof.

Figure 3 is a sectional view taken approximately on line 3—3 of Figure 1, looking in the direction of the arrows.

Figure 4 is a similar view illustrating the use of a pad lock of my device, for securing the same locked in operative position.

Figure 5 is a sectional view taken approximately on line 5—5 of Figure 1, looking in the direction of the arrows.

Referring to the drawing in detail, the letter A indicates the front or steering tube of the frame of a bicycle, B the steering post and C the fork which is formed on or secured to the post in the usual manner, while D indicates the front wheel, with the usual tire E on the rim thereof, and F the mud guard.

The device which forms the subject matter of the present invention includes a keeper made up of a pair of companion clamping members provided with arcuate portions 1 for disposal about the tube A and held in clamping association therewith by a screw 2 threaded in keeper lugs 3 the latter extending forwardly from the arcuate portions in face to face contact with each other and having substantially pointed outer ends.

Cooperating with the keeper is the movable member of my device which includes a substantially rectangular body member 4 having a slot 5 extending therethrough to receive the keeper lugs 3 for slidable association thereon, as will be apparent. Formed on and depending from the lower end of the body member 4 is an arm 6 which is laterally bent as at 7 for disposal laterally of the wheel and thence is bent in curved formation rearwardly and upwardly to provide a substantially U-shaped lower portion 8. Formed on the rear end of the U-shaped lower portion 8 of the arm 6, is a laterally directed portion 9 that terminates in a rounded free end 10 providing a brake shoe for engagement with the tire E, the shoe being curved to follow the transverse curvature of the tire, for that purpose.

A substantially U-clamp 11 is provided to be mounted on the fork C and held accordingly by a threaded pin 12 extending through the arms of the U-clamp as best shown in Figure 5. The extending end of the pin 12 provides a pivot and the arm 6 is pivotally mounted thereon at the juncture of the laterally directed portion 9 with the U-shaped portion 8, and held accordingly by a closed nut, as shown, so that the arm is movable on the pin 12 from the dotted line position of Figure 1, to the full line position for disposing the brake shoe in gripping engagement with the tire. The device is held in normal position with the brake shoe out of engagement with the tire and against the mud guard F, by a coil spring 13 that has its end convolutions secured to the laterally directed portion 9 and the U-clamp 11, respectively.

In order to operate the device against the action of the coil spring 13, it will be noted that the body member 4 has formed thereon and rising therefrom a lever 14 having a knob 15 on the upper end thereof to provide a handle.

The body member has mounted thereon a spring pressed headed pin 16 that is connected thereto by the spring 17 thereof, which surrounds the shank of the pin and has one of its end convolutions engaged with the head and its opposite end fixed to the body member, with the pin mounted in an opening through one wall of the body member, as shown, and the lugs or fingers 3 of the keeper have registering openings 18 therethrough for disposal of the opening of the body member in registration therewith, to receive the pin 16 therein, as shown in Figure 3, for holding the shoe in gripping engagement with the tire.

When it is desired to lock the device in operative position, or with the shoe in gripping engagement with the tire, the arm 6 is moved so that the body member is disposed inwardly beyond the openings 18 so that the hasp of a pad lock 19 can be passed through the openings 18, as shown in Figure 4. While a pad lock has been shown for that purpose, it will be obvious that any other suitable key actuated or combination locking means may be employed.

From the above description and disclosure of the drawing, it will be obvious that when my device is in operative position as shown in full lines in Figure 1, that the front wheel is locked against movement, in a straight forward position, either on its horizontal or vertical axis, that is the wheel cannot rotate on its bearings, or turn right or left through the steering mechanism, consequently the bicycle can be readily parked against a suitable supporting means without fear or possibility of it rolling away or falling, and is rendered substantially theft proof by the pad lock or the like, as set forth.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A bicycle locking device comprising a keeper, means for fixing the keeper to the frame of the bicycle, a wheel engaging means, means for pivotally connecting the engaging means to the frame, means normally holding the engaging means out of wheel engaging position, handled means for moving the engaging means into operative position, slotted means carried by the handled means, and received by the keeper with the latter in the slot thereof, said keeper having an opening therein, and means carried by the slotted means and received in the opening for holding the engaging means in operative position.

2. A bicycle locking device comprising a keeper, means for fixing the keeper to the frame of a bicycle, a wheel engaging means, means for pivotally connecting the wheel engaging means to the frame, means normally holding the engaging means out of wheel engaging position, handled means for moving the engaging means into operative position, slotted means carried by the handled means and received by the keeper with the latter in the slot thereof, said keeper having an opening therein, locking means receivable in the opening and being engageable with the slotted means for locking the wheel engaging means in operative position and said locking means being detachable from the keeper.

3. A bicycle locking device comprising a keeper including a pair of clamping members provided with fingers having registering openings therein, means for fixing the clamping members to the steering tube of the frame of the bicycle with the fingers extending forwardly therefrom, a shoe curved to follow the curvature of the tire of the front wheel of the bicycle, a curved arm having the shoe formed thereon, means pivotally connecting the arm to the fork of the front wheel, a slotted body member having the arm formed on and depending therefrom and received by the fingers with the latter extending through the slot, spring means for normally holding the shoe out of tire engaging position, handled means rising from the body member for moving the latter on to the fingers and the shoe in operative position, and a spring pressed pin carried by the body member and received in the registering openings of the fingers for holding the shoe in operative position.

4. A bicycle locking device comprising a keeper including a pair of clamping members provided with fingers having registering openings therein, means for fixing the clamping members to the steering tube of the frame of the bicycle with the fingers extending forwardly therefrom, a shoe curved to follow the curvature of the tire of the front wheel of the bicycle, a curved arm having the shoe formed thereon, means pivotally connecting the arm to the fork of the front wheel, a slotted body member having the arm formed on and depending therefrom and received by the fingers with the latter extending through the slot, spring means for normally holding the shoe out of tire engaging position, handled means rising from the body member for moving the latter on to the fingers and the shoe in operative position, and said body member being movable inwardly beyond the openings and a pad lock receivable in the openings with its hasp engaged with the body member to lock the shoe in operative position.

RAY E. COATS.